March 7, 1939. MacMILLAN CLEMENTS 2,149,882
METHOD OF MAKING A FLANGED PANEL
Filed March 1, 1937
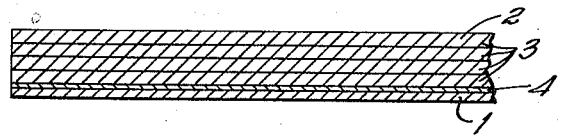
FIG.1
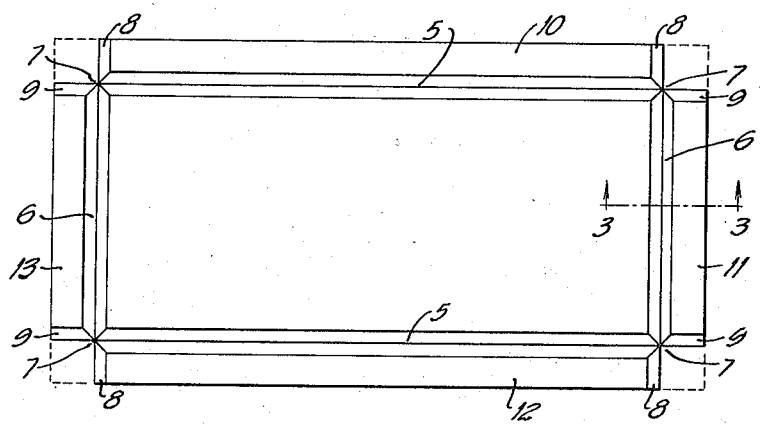
FIG.2
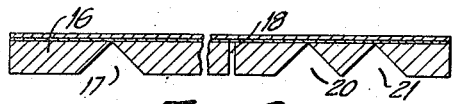
FIG.8
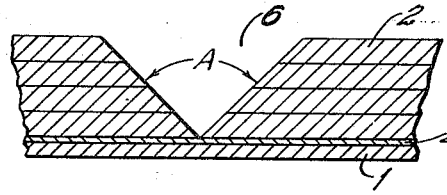
FIG.3
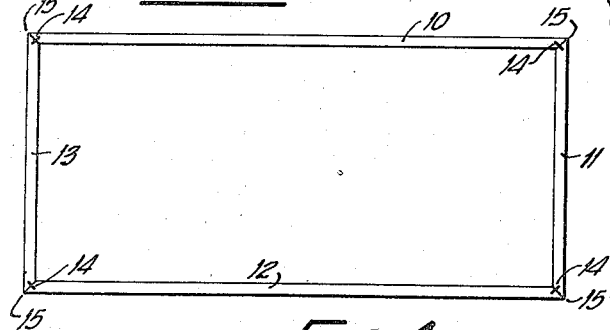
FIG.4
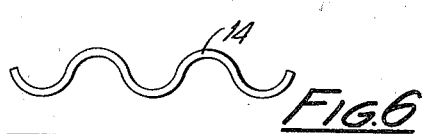
FIG.6
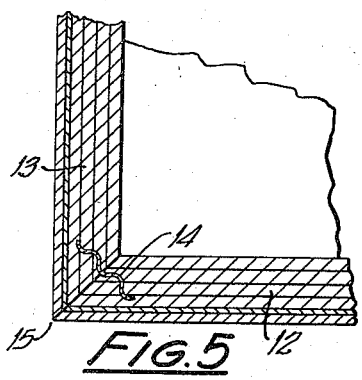
FIG.5
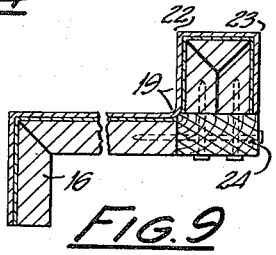
FIG.9
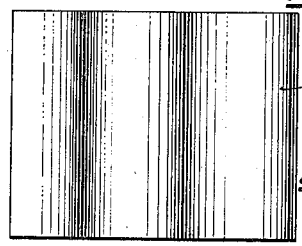
FIG.7
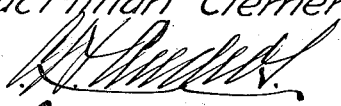
INVENTOR
MacMillan Clements
By
ATTORNEY Patented Mar. 7, 1939

2,149,882

UNITED STATES PATENT OFFICE 2,149,882

METHOD OF MAKING A FLANGED PANEL

MacMillan Clements, Schenectady, N. Y., assignor to Allegheny Ludlum Steel Corporation, Pittsburgh, Pa., a corporation of Pennsylvania Application March 1, 1937, Serial No. 128,319

4 Claims. (Cl. 29—148)

My invention relates to the sheet-metal working art and particularly to a method of forming a flanged panel as an integral unit from a composite sheet or board comprising a facing of thin sheet metal adhesively secured to a reinforcing backing. Such sheets or boards have been formed by cementing a facing of thin sheet metal, such as stainless steel or iron, to a wood backing comprising two or more comparatively thin layers or laminae adhesively secured together under high pressure to form a substantially integral unit.

It has heretofore been proposed to use such composite material to form metal covered table tops, counters, shelves, desks, wall panels, and the like, but it is practically impossible to obtain and maintain therewith perfectly plane surfaces, such as are desirable for products of this character, because of the tendency of the wood backing material to warp. When the metal sheet is applied to only one side of the backing, the composite structure initially curls or warps to an appreciable degree in one direction and, thereafter, warps to a considerably greater degree in the opposite direction, with the result that the composite product is curled and distorted to such an extent as to be substantially worthless for most purposes. It has also been impossible to finish table tops and the like in a satisfactory manner, especially along the edges, and where a metal-faced depending or upstanding flange is "built-on" along the edge of the structure it has generally been necessary to cover the edges of the structure with a molding in order to conceal the rather unsightly appearance thereof. It is also practically impossible to weld or solder the metal facing in the flange to the metal facing of the top and maintain a straight uniform appearing edge.

It should be clearly understood that composite sheet products formed by adhesively securing a sheet of thin metal to one side only of a plywood backing having heretofore been entirely impracticable because they are warped and distorted from the very beginning. However, by my procedure it is possible to start with such a warped sheet and, by forming integral flanges thereon at right angles to the general plane of the sheet, to force and truss it into a panel having a face which is perfectly and permanently plane.

The principal object of my invention is to provide an integral, composite flanged panel of the general character described which will have a substantially plane surface and which will be practically free from warping and distorting. Another object is to provide an integral composite structure of this type which will be substantially more rigid and have greater strength than panels of the type now employed. A further object is to provide a simple method of procedure whereby such structures may be fabricated.

I accomplish these by the means and method described below and illustrated in the accompanying drawing in which—

Fig. 1 is a fragmentary section, metal face down, of the composite board or sheet from which my panel is formed;

Fig. 2 is a bottom plan view of a board before it is bent to form the panel;

Fig. 3 is a fragmentary cross section in the plane 3—3 of Fig. 2 drawn to an enlarged scale;

Fig. 4 is a bottom view of the completed panel;

Fig. 5 is a fragmentary bottom plan view of the table, drawn to an enlarged scale, and showing the corner construction;

Fig. 6 is a plan view of a fastening element;

Fig. 7 is an elevation view of a fastening element;

Fig. 8 is a fragmentary sectional view, metal face up, of a composite board showing how the backing is grooved to form an integral, depending flange at one edge and an upstanding flange at the opposite edge; and Fig. 9 is a fragmentary sectional view, metal face up, showing how the board in Fig. 8 is bent to form the depending lip and upstanding flange.

Referring to the drawing, I represents a thin sheet of metal, such, for example, as stainless steel, which is secured to a backing 2 by means of an adhesive 4. The backing 2 may be of ordinary wood, a plurality of thin layers of wood adhesively secured together as is well known in the art, or in fact, any material capable of being worked in the manner hereinafter described.

Assuming that a flanged panel for use as a table top or the like is to be formed, a board or sheet of the composite material shown in Fig. 1, and somewhat larger than the table top, is placed with the metal side down as shown in Fig. 2. V-shaped grooves 5 and 6 parallel, respectively, to the longer and shorter edges of the sheet, are formed in the backing by routing out the material of the backing as shown in Fig. 3. If the depending flange to be formed about the edges of the table is to be perpendicular to the plane of the top, the angle A included between the sides of the V should be ninety degrees and, of course, the vertex of the V should be substantially coincident with the back of the metal facing 1.

That is to say, only the backing is removed and the metal facing is left intact. The grooves 5 and 6 intersect near the corners of the composite sheet, as shown at 7, and are carried across each other to the edges as shown at 8 and 9. The dotted corner portions of the sheet are carefully cut out and the edge portions 10, 11, 12 and 13 of the sheet are then bent upwardly so that the opposite sides of the grooves are brought together. Glue or other appropriate adhesive is applied to the sides of the grooves and the edges are secured in upturned relation by means of the corrugated elements 14 which are driven into the backing material as shown in Figs. 4 and 5. During the drying of the glue and when the corrugated elements are driven home, the flanges should be secured in upturned relation by an appropriate clamping means (not shown).

From the foregoing it will be apparent that the metal facing sheet is continuous over the edges of the panel and that the only breaks in the entire metal surface are at the corners 15. If desired, these breaks may be soldered but ordinarily it is only necessary to dress the same with a file.

The panel or table top thus has a downturned flange, such as shown at 16 in Fig. 9, extending entirely around the edges thereof and which serves not only to stiffen and strengthen the entire structure but also to prevent warping and buckling thereof.

In forming a counter or the like it may be desirable to form the same with an upturned flange along one edge and a downturned flange along the opposite edge. This may be easily done by forming grooves in the backing as shown in Fig. 8. For example, the groove 17 is similar to groove 5 as shown in Fig. 3 and permits the portion 16 of the sheet to be bent downwardly to form the depending lip 16 shown in Fig. 9.

At the point where the upturned flange is to rise merely a saw cut 18 is made through the backing which permits the composite panel to be bent upwardly as shown at 19. The top of the upturned flange may be neatly formed by cutting contiguous grooves 20 and 21 (or spaced grooves if a thicker flange is desired) in the backing as shown in Fig. 8. This will permit the metal facing to be bent along the lines 22 and 23 so that a continuous metal covering extending from the bottom of the depending lip 16 across the top of the table and around the upturned flange is obtained. In order to stiffen the upturned flange, a strip of wood 24 may be glued and nailed in place as shown in Fig. 9.

While I have described my method of procedure in connection with products having a backing of wood, it is to be understood that any other backing material, which can be adhesively secured to the metal facing to reinforce the same and which is capable of being worked in the manner described, may be employed.

What I claim is:

1. In the art of sheet metal working, those steps in the method of forming a flanged panel from a rectangular, board-like product comprising a sheet metal facing adhesively secured to a wood backing which comprise, cutting a V-shaped groove in said backing parallel to each edge of said product and with the bottom of the grooves substantially coincident with the back of said facing, removing those portions of the product at the corners thereof and included between the bottom lines of the grooves, bending said product along each of the lines defined by the bottoms of said grooves until the sides of each of said grooves are substantially coincident, and soldering the metal facing of the flanges together at the corners.

2. In the art of sheet metal working, those steps in the method of forming a substantially plane panel from a composite sheet product comprising a sheet metal facing adhesively secured to one side only of a board-like backing which comprise, forming a V-shaped groove in said backing adjacent an edge of said product and with the bottom of said groove substantially coincident with the back of said facing, bending said product along the line defined by the bottom of said groove until the sides of said groove are substantially together, whereby to truss said product along said edge and force the surface portion thereof adjacent said edge to assume substantially a plane configuration; and thereafter securing the parts in bent relation.

3. In the art of sheet metal working, the method of forming a substantially plane panel from a composite sheet product comprising a sheet metal facing adhesively secured to one side only of a board-like backing which comprises, forming a V-shaped groove in said backing parallel to each edge of said product and with the bottoms of the grooves substantially coincident with the back of said facing, removing those portions of the product at the corners thereof and included between the bottom lines of the grooves, bending said product along each of the lines defined by the bottoms of said grooves until the sides of each of said grooves are substantially together, and securing the parts in bent relation.

4. In the art of sheet metal working, those steps in the method of forming a flange along an edge of a panel comprising a thin sheet metal facing adhesively secured to one side only of a backing of workable sheet material substantially coextensive therewith which comprise, completely severing said backing along a line parallel to said edge, forming in said backing intermediate said line and edge a V-shaped groove parallel to said edge and with the vertex of the V substantially coincident with the back of said facing; forming a second, similar groove in said backing parallel to and adjacent said first groove, bending said metal facing along the lines defined by the bottoms of said grooves and in a direction to bring the sides of each of said grooves together, bending said metal facing in the opposite direction along the line of severing of said backing and through an arc of substantially ninety degrees, and securing the parts together in bent relation.

MACMILLAN CLEMENTS.